Patented June 23, 1931

1,810,905

UNITED STATES PATENT OFFICE

DONALD W. CARTER, OF CLEVELAND HEIGHTS, OHIO

LUBRICATING-FILM-FORMING COMPOSITION

No Drawing.  Application filed May 17, 1926. Serial No. 109,784.

The object of my invention is to produce a composition adapted to lubricate and form a film on objects to which it is applied which film can be made in different degrees of consistency heavier than the usual lubricating oils or greases and this heavier consistency can be made more or less force resisting or more or less compressible than the usual lubricating oils and greases and to combine a larger proportion of lighter flowing oils with a smaller proportion of heavier materials in a more freely flowing compound intended to be used in connection with cutting tools such as drills, milling cutters, lathe tools, and the like, and to decrease the proportion of the oils or greases and increase the proportion of the heavier materials in a compound intended to be used to protect sticking of objects to each other as in punching or forming dies or between material operated on and the dies.

Generally speaking, my composition has a lubricating material, a heavy film forming material, and a binder material each more clearly defined hereinafter.

In order to avoid repeated detailed recitation of the different available elements of the composition in the specification and in some of the claims I use the terms "lubricating material," "heavy film form material," "binder material," "metallic material," and "mineral material."

The lubricating material may be any of the well known free flowing oils such as lard oil or petroleum oil or other oils such as are generally used for lubricating purposes with oil cans or sight feed oiling devices or may be any of the well known lubricating greases such as are used in grease cups and the like.

The heavy film forming material may be a metallic material defined below, or a mineral material defined below, or a combination of both of these materials.

The binder material may be any combining agent adapted to the other materials such as the well known commercial line commonly known as calcium hydrate.

The term "metallic material" includes the metal bases such as carbonate or silicate or sulphite or oxide of zinc, and the dust derivates of zinc or of other metals as zinc dust for instance. The term "mineral material" includes the mineral pigments of such materials as white lead or whiting.

A good composition for general commercial purposes is formed by mixing, in substantially equal proportions by weight, one part of lubricating material composed of one half commercial lard oil and one half commercial petroleum oil, one part of oxide of zinc as the metallic film forming part of the composition, one part of commercial whiting as the mineral film forming part of the composition, and one part of commercial lime commonly known as calcium hydrate as the binder part of the composition.

In the composition described, the binder material, in the present instance calcium hydrate, combines with the lubricating material as well as with the heavy film forming material and thereby causes a more complete and more permanent mixture or impregnation of the lubricating and the film forming materials and consequently less liability of separation of these materials after the composition is formed.

The composition formed in the proportions mentioned is a commercial composition as prepared for shipment, in some instances the composition may be used as so prepared, in other instances it may be necessary or convenient or desirable to have a more free flowing composition in which case more lard oil, or more petroleum oil, or both, or the equivalent thereof as described may be added to attain the required consistency of the composition. For such purposes as drilling, an easily flowing composition is desirable while for such purposes as punching or forming a composition near the consistency of paste or paint is desirable.

The addition of oil or other thinning agent renders the composition better applicable to such operations as drilling which require no such heavy film as do the punching and forming operations; therefore, the proportional increase of the lubricating material over the proportions set forth, does not decrease the values of the compositions in such operations as in drilling.

My composition has the property of lubricating and of forming a film heavier than a film formed by the lubricating material. My composition not only lubricates but also provides an effective means for preventing the sticking of objects to each other.

The material to form my composition as set forth are readily procurable in the open market.

I claim:—

1. A composition of the character described including in substantially equal proportions a lubricating material composed of one half commercial lard oil and one half commercial petroleum oil, oxide of zinc and commercial whiting, and a binder material of the family in which lime is found.

2. A composition of the character described including, in proportions for purposes set forth, lard oil, petroleum oil, oxide of zinc, commercial whiting, and calcium hydrate.

DONALD W. CARTER.